(12) United States Patent
Schmalz (10) Patent No.: US 7,161,775 B2
(45) Date of Patent: Jan. 9, 2007

(54) ARC FAULT CIRCUIT BREAKER AND APPARATUS FOR DETECTING WET TRACK ARC FAULT

(75) Inventor: Steven C. Schmalz, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 435 days.

(21) Appl. No.: 10/850,885

(22) Filed: May 21, 2004

(65) Prior Publication Data

US 2005/0259369 A1 Nov. 24, 2005

(51) Int. Cl.
*H02H 3/00* (2006.01)
*H02H 7/00* (2006.01)

(52) U.S. Cl. .................... 361/5; 361/6; 361/7
(58) Field of Classification Search .................... 361/5, 361/6, 7
See application file for complete search history.

(56) References Cited

U.S. PATENT DOCUMENTS

| 4,081,852 | A | 3/1978 | Coley et al. |
| 4,709,125 | A | 11/1987 | Lindsey |
| 4,873,604 | A | 10/1989 | Goldberg et al. |
| 5,224,006 | A | 6/1993 | MacKenzie et al. |
| 5,260,676 | A | 11/1993 | Patel et al. |
| 5,293,522 | A | 3/1994 | Fello et al. |
| 5,691,869 | A | 11/1997 | Engel et al. |
| 5,818,237 | A | 10/1998 | Zuercher et al. |
| 6,650,515 | B1 | 11/2003 | Schmalz |
| 2002/0038199 | A1 | 3/2002 | Blemel |
| 2002/0130668 | A1 | 9/2002 | Blades |
| 2003/0201780 | A1 | 10/2003 | Blades |

*Primary Examiner*—Stephen W. Jackson
*Assistant Examiner*—Dharti H. Patel
(74) *Attorney, Agent, or Firm*—Marvin L. Union (57) ABSTRACT

An apparatus includes a first circuit detecting when an absolute value of a current signal is less than a first predetermined value and outputting a signal after a first time period. A comparator compares that signal to an envelope of a rectified current signal, in order to provide an output with a plurality of pulses that persist for a relatively longer time for a relatively small value of the envelope, and persist for a relatively shorter time for a relatively large value of the envelope. A second circuit enables the comparator output if the rectified current signal exceeds a second predetermined value, and disables the comparator output after the rectified current signal is below the second predetermined value for a second time period. A third circuit accumulates the pulses and outputs a signal representative of a wet track arc fault.

20 Claims, 5 Drawing Sheets

ARC FAULT CIRCUIT BREAKER AND APPARATUS FOR DETECTING WET TRACK ARC FAULT

BACKGROUND OF THE INVENTION

1. Field of the Invention

This invention relates to circuit interrupters including arc fault trip mechanisms and, more particularly, to electronic trip units for circuit breakers, which respond to sputtering arc faults. The invention also relates to apparatus for detecting arc faults.

2. Background Information

Circuit interrupters include, for example, circuit breakers, contactors, motor starters, motor controllers, other load controllers and receptacles having a trip mechanism. Circuit breakers are generally old and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bi-metal, which is heated and bends in response to a persistent overcurrent condition. The bi-metal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

There has been considerable interest in providing protection against arc faults. Arc faults are intermittent high impedance faults which can be caused, for instance, by worn insulation between adjacent conductors, by exposed ends between broken conductors, by faulty connections, and in other situations where conducting elements are in close proximity. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; 5,691,869; and 5,818,237.

It is believed that most arc fault detectors perform poorly or are completely ineffective in detecting wet track arc faults in wiring harnesses comprised of polyimide (e.g., Kapton®) insulated wire because such faults exhibit nearly sinusoidal fault currents. It is believed that known arc fault detectors do not respond unless the arc fault current exhibits a relatively more severely distorted characteristic.

Some known prior art arc fault detectors for aerospace applications trip on relatively high, near sinusoidal currents and sinusoidal currents, which are caused by wet track arc faults and by motor inrush, respectively. For example, if the absolute current amplitude exceeds a predetermined threshold (e.g., about five times rated current), then the arc fault detector initiates a trip. There is a need for an arc fault detector to eliminate nuisance tripping that results from an inability to discern between those two types of currents.

Accordingly, there is room for improvement in circuit breakers and apparatus for detecting arc faults.

SUMMARY OF THE INVENTION

These needs and others are met by the present invention, which provides an arc fault detector circuit that is adapted to be non-responsive to current in an electrical system being, for example, a sinusoidal motor start-up inrush current and to be responsive to current in such electrical system having a wet track arc signature.

In accordance with one aspect of the invention, a circuit breaker for interrupting current in an electrical system comprises: separable contacts adapted to interrupt the current in the electrical system; a trip mechanism adapted to trip open the separable contacts in response to a trip signal; and a trip circuit outputting the trip signal, the trip circuit comprising: a circuit adapted to generate a current signal representative of the current in the electrical system, to rectify the current signal to provide a rectified current signal and to track an envelope of the rectified current signal, a first arc fault detector circuit including a first output, a second arc fault detector circuit comprising: a first circuit adapted to detect when an absolute value of the current signal is less than a first predetermined value and output a signal after a first time period, a comparator adapted to compare the signal after a first time period to the envelope of the rectified current signal, in order to provide a second output with a pulse, which persists for a relatively longer time for a relatively small value of the envelope, and which persists for a relatively shorter time for a relatively large value of the envelope, and a second circuit adapted to enable the second output of the comparator if the rectified current signal exceeds a second predetermined value, and to disable the second output of the comparator after the rectified current signal is below the second predetermined value for a second time period, and an accumulator including an output having the trip signal, the output of the accumulator being responsive to the first output of the first arc fault detector circuit and to the second output of the comparator.

The comparator may be a first comparator. The second circuit may include a time delay and a second comparator having a negative input for the rectified current signal, a positive input for a signal representative of the second predetermined value, and an output, the time delay adapted to delay the output of the second comparator.

The first circuit may include a first comparator, a second comparator and a time delay, the first and second comparators having a common output, the time delay having a series combination of a capacitor and a resistor, which are electrically connected to the common output, the capacitor is normally discharged by the common output when the absolute value of the current signal is greater than the first predetermined value, the capacitor is charged through the resistor when the absolute value of the current signal is less than the first predetermined value, in order to generate the signal after a first time period.

As another aspect of the invention, a circuit breaker for interrupting current in an electrical system comprises: separable contacts adapted to interrupt the current in the electrical system; a trip mechanism adapted to trip open the separable contacts in response to a trip signal; and a trip circuit outputting the trip signal, the trip circuit comprising: a first circuit adapted to generate a current signal representative of the current in the electrical system, a second circuit adapted to rectify the current signal and provide a rectified current signal, a third circuit adapted to track an envelope of the rectified current signal, a first arc fault detector circuit including a first input of the rectified current signal, a second input of the envelope of the rectified current signal and a first output, a second arc fault detector circuit comprising: a window comparator circuit adapted to detect when an absolute value of the current signal is less than a first predetermined value and output a signal, a first time delay adapted to delay the signal output by the window comparator and output a first delayed signal, a comparator adapted to compare the first delayed signal of the first time delay to the envelope of the rectified current signal, in order to provide an output with a pulse, which persists for a relatively longer time for a relatively small value of the envelope, and which persists for a relatively shorter time for a relatively large value of the envelope, a threshold detector circuit including an output with a signal, the threshold detector circuit adapted to detect if the rectified current signal exceeds a second predetermined value, a second time delay adapted to delay the signal of the output of the threshold detector circuit after the rectified current signal is below the second predetermined value and output a second delayed signal, and an and circuit outputting a second output responsive to the pulse and the second delayed signal, and an accumulator including an output having the trip signal, the output of the accumulator being responsive to the first output of the first arc fault detector circuit and to the second output of the and circuit.

The second arc fault detector circuit may be adapted to be non-responsive to the current in the electrical system being a sinusoidal motor start-up inrush current and to be responsive to the current in the electrical system having a wet track arc signature.

The second delayed signal may disable the second output of the and circuit for the rectified current signal being less than the second predetermined value after the second time delay, and may enable the second output of the second arc fault detector circuit for the rectified current signal being greater than the second predetermined value.

The and circuit may comprise a current source including an input for the pulse and an output, which is the second output; and a switch including an input for the second delayed signal and an output, which disables the input of the current source.

As another aspect of the invention, an apparatus detects a wet track arc fault for a current in an electrical system including a circuit providing a current signal from the current, a circuit providing a rectified current signal from the current signal, and a circuit providing an envelope of the rectified current signal. The apparatus comprises: a first circuit adapted to detect when an absolute value of the current signal is less than a first predetermined value and output a signal after a first time period; a comparator adapted to compare the signal after a first time period to the envelope of the rectified current signal, in order to provide an output with a plurality of pulses, the pulses persisting for a relatively longer time for a relatively small value of the envelope, and persisting for a relatively shorter time for a relatively large value of the envelope; a second circuit adapted to enable the output of the comparator if the rectified current signal exceeds a second predetermined value, and to disable the output of the comparator after the rectified current signal is below the second predetermined value for a second time period; and a third circuit adapted to accumulate the pulses from the output of the comparator and output a signal representative of the wet track arc fault.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a miniature circuit breaker, such as that described in U.S. Pat. No. 4,081,852, which is hereby incorporated by reference. That circuit breaker incorporates a thermal-magnetic trip device comprising a bi-metal and a magnetic armature, which unlatch a spring driven mechanism to open separable contacts in response to a persistent overcurrent and a short circuit current, respectively. The circuit breaker of U.S. Pat. No. 4,081,852 includes a ground fault detector which can be replaced by, or be used in addition to, the arc fault detector which forms a part of the present invention.

Figure 1:
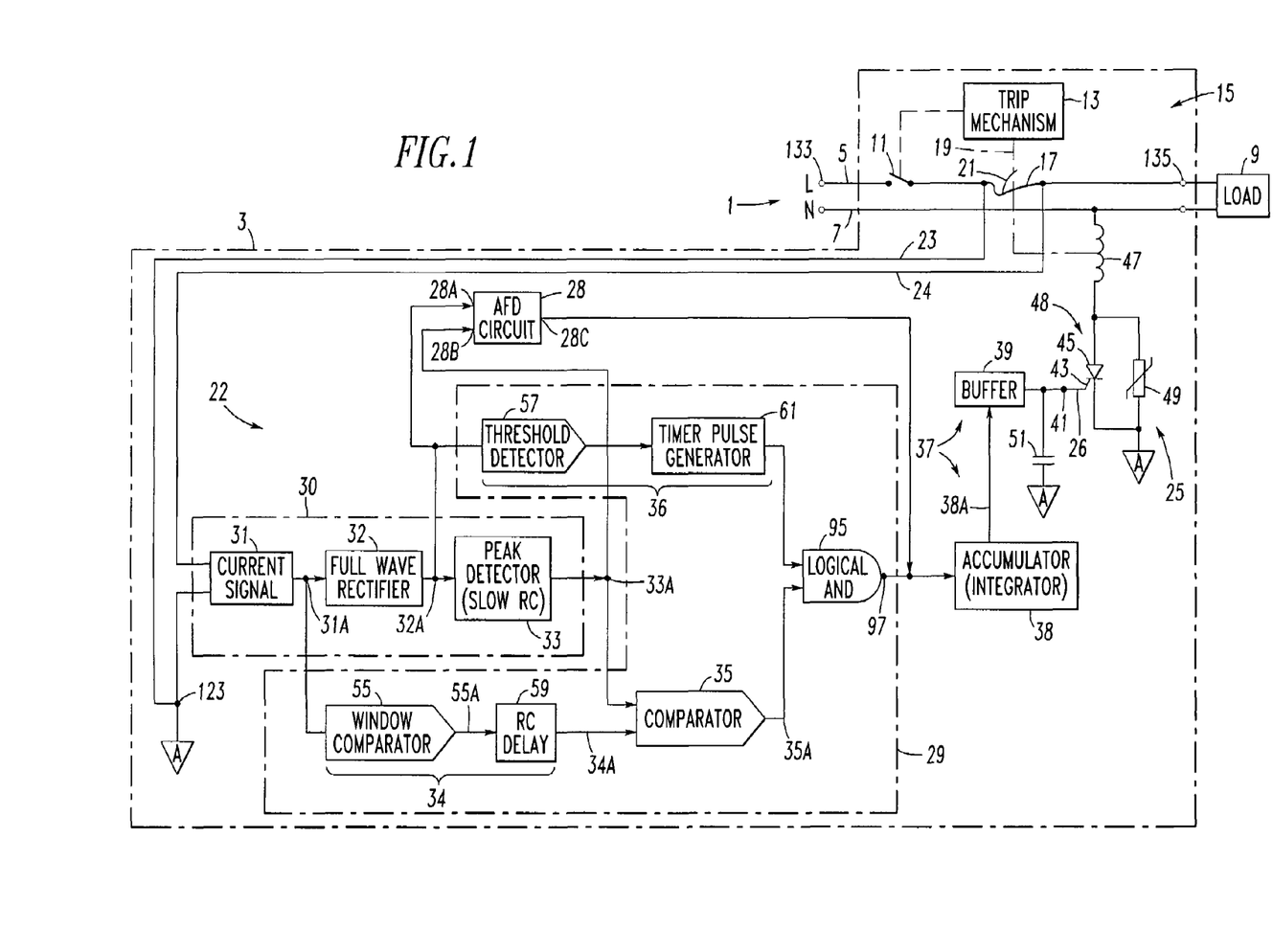
FIG. 1 is a block diagram of circuit breaker in accordance with the present invention.

Turning to FIG. 1, the electrical system 1 protected by the circuit breaker 3 includes a line conductor 5 and a neutral conductor 7 electrically connected to provide power to a load 9. The circuit breaker 3 includes separable contacts 11 which can be tripped open by a spring operated trip mechanism 13, in order to interrupt current in the electrical system 1. The trip mechanism 13 may be actuated by a conventional thermal-magnetic overcurrent device 15. This thermal-magnetic overcurrent device 15 includes a bi-metal 17 electrically connected in series with the line conductor 5. Persistent overcurrents heat up the bi-metal 17 causing it to bend and release a latch 19 which actuates the trip mechanism 13. Short circuit currents through the bi-metal 17 magnetically attract an armature 21 which alternatively releases the latch 19 to actuate the trip mechanism 13. Although an example trip mechanism 13 is shown, a wide range of trip mechanisms may be employed.

Although a single-pole circuit breaker 3 is disclosed, the invention is applicable to circuit breakers having any number of poles or phases (e.g., a three-phase circuit breaker).

In addition to the thermal-magnetic overcurrent device 15, which provides conventional protection, the circuit breaker 3 provides an arc fault detector trip circuit 22. This arc fault detector trip circuit 22 includes a pair of leads 23 and 24 electrically connected to sense voltage across the bi-metal 17. As the resistance of the bi-metal 17 is known (e.g., for the exemplary bi-metal, about 0.007 to about 0.100 ohms, although a wide range of values are possible), this voltage is a measure of the current flowing through the line conductor 5.

A trip actuator 25 of the trip mechanism 13 is adapted to trip open the separable contacts 11 in response to a trip signal 26 output by the trip circuit 22. A first portion 28 of the arc fault detector trip circuit 22 may respond to an inverse relationship between the magnitude of step increases in current produced by the striking of an arc in the electrical system 1, and the rate at which such arcs are struck, or may respond to randomness in an envelope of peak magnitudes of such current. In accordance with the present invention, a second portion 29 of the arc fault detector trip circuit 22 responds to parallel wet track arc faults in the electrical system 1.

A circuit 30 is adapted to generate a current signal representative of the current in the electrical system 1, to rectify the current signal and to track an envelope of the rectified current signal. The circuit 30 includes a buffer circuit 31 adapted to generate a current signal 31A representative of the current (e.g., as sensed across the bi-metal 17) in the electrical system 1, a circuit 32 adapted to provide a rectified current signal 32A from the current signal 31A, and a circuit 33 adapted to track an envelope 33A of the rectified current signal 32A. The first portion 28 of the arc fault detector trip circuit 22 includes a first input 28A of the rectified current signal 32A, a second input 28B of the envelope 33A of the rectified current signal 32A and a first output 28C.

The second portion 29 of the arc fault detector trip circuit 22 includes a first circuit 34 adapted to detect when an absolute value of the current signal 31A is less than a first predetermined value and output a signal 34A after a first time period. The second portion 29 also includes a comparator 35 adapted to compare the signal 34A to the envelope 33A of the rectified current signal 32A, in order to provide a second output 35A with a pulse, which persists for a relatively longer time for a relatively small value of the envelope 33A, and which persists for a relatively shorter time for a relatively large value of the envelope 33A. The second portion 29 further includes a second circuit 36 adapted to enable the output 35A of the comparator 35 if the rectified current signal 32A exceeds a second predetermined value (e.g., without limitation, about five times rated current), and to disable the comparator output 35A after the rectified current signal 32A is below the second predetermined value for a second time period.

An accumulator circuit 37 includes an integrator portion 38 responsive to the output 28C of the first arc fault detector circuit 28 and to the output 35A of the comparator 35, when enabled by the second circuit 36. The accumulator circuit 37 also includes a buffer portion 39 having an output 41 with the trip signal 26. The output 38A of the integrator portion 38 is responsive to the output 28C and to the output 35A, when enabled by the second circuit 36.

The buffer output 41 applies a turn-on voltage from the trip signal 26 to the gate 43 of an SCR 45. The trip actuator 25 includes the trip latch 19, which is adapted to trip open the separable contacts 11, a trip coil 47 adapted to actuate the trip latch 19 when energized, and a circuit 48 adapted to energize the trip coil 47. Turn-on of the SCR 45 energizes the trip coil 47, which releases the trip latch 19 on the trip mechanism 13 to open the contacts 11. The SCR 45 is protected from voltage surges by the varistor 49 and its gate 43 is protected from noise by a capacitor 51. Current for the arc fault detector trip circuit 22 is drawn from the neutral conductor 7 through the coil 47 and through the SCR 45.

The arc fault detector trip circuit 22 advantageously includes the second arc fault detector circuit 29, in order to provide discrimination between parallel wet track arc faults and other load events (e.g., without limitation, resulting from three-phase motor start-up inrushes). The ability of the circuit 29 to distinguish between parallel wet track arc faults and, for example, motor start-up inrushes, is based upon the fact that a motor start-up inrush is purely sinusoidal, while wet track arc signatures exhibit noticeable dwell time at zero crossings of the current waveform.

Figure 2A:
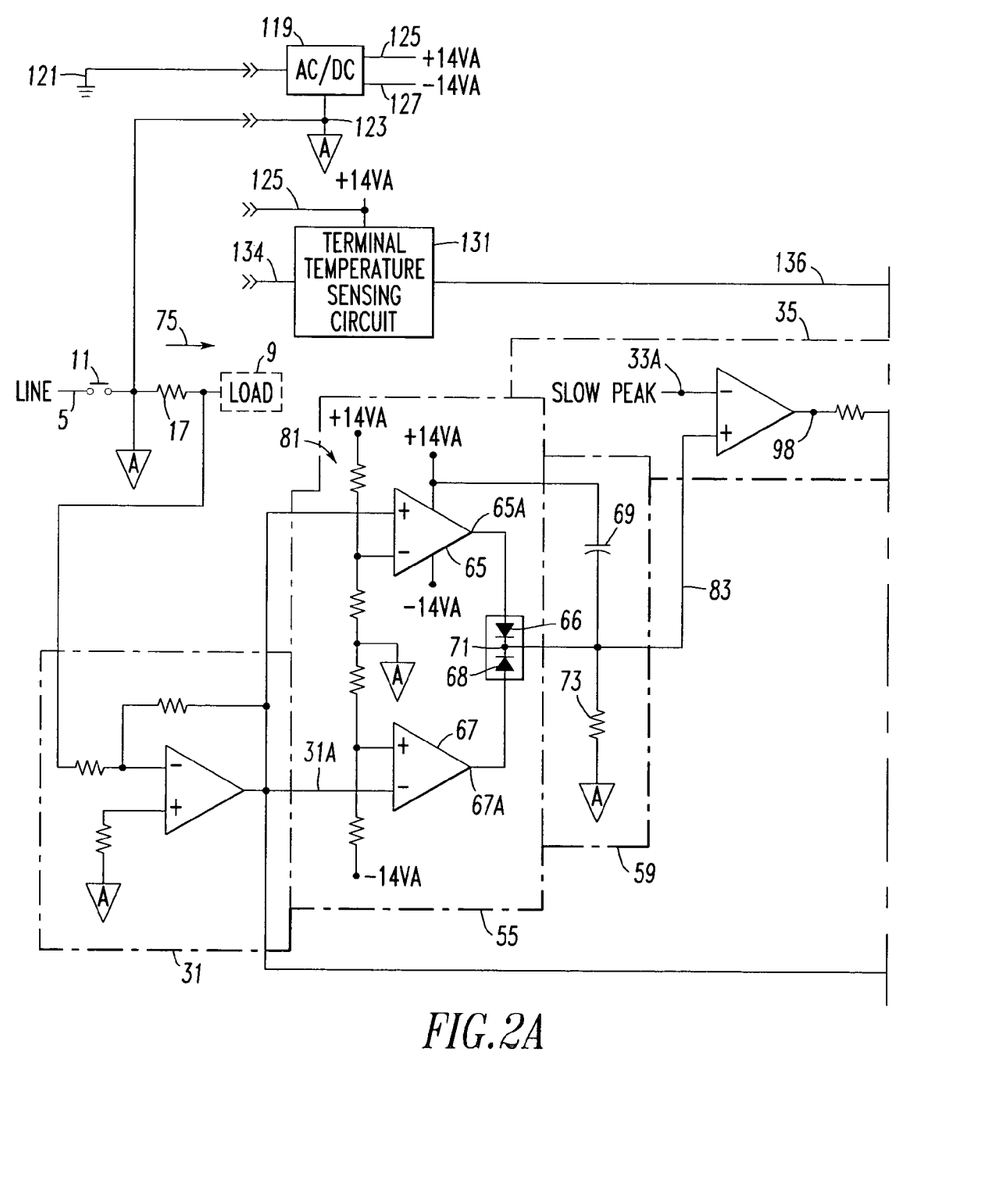
FIGS. 2A–2B form a schematic diagram of a circuit breaker arc fault detection circuit in accordance with another embodiment of the invention.
Figure 2B:
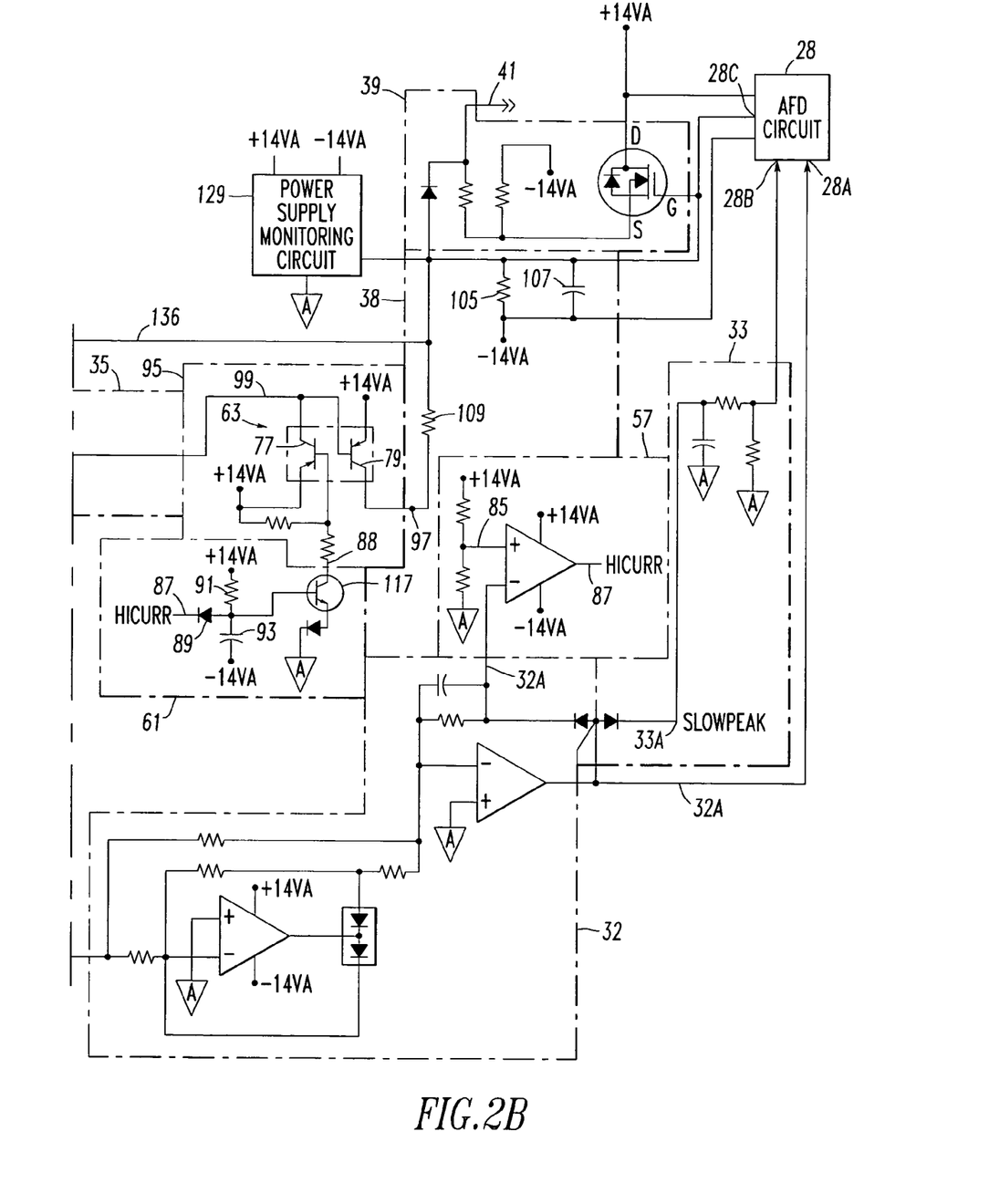

As shown in FIGS. 2A–2B, the second arc fault detector circuit 29 of FIG. 1 includes a window comparator 55, a threshold detector 57, two timers 59,61, and a current source 63. The first circuit 34 of FIG. 1 includes the window comparator 55 and the first timer 59. The second circuit 36 of FIG. 1 includes the threshold detector 57 and the second timer 61. Two comparators 65,67 form the window comparator 55, which is adapted to detect when an absolute value of the input current signal 31A is less than a first predetermined value (e.g., is in suitable close proximity to zero current). The first comparator 65 includes a first output 65A and a first diode 66. The second comparator 67 includes a second output 67A and a second diode 68. The cathodes of the first and second diodes 66,68 are electrically connected to a common output 71, and the anodes of those diodes are electrically connected to the outputs 65A,67A of the respective comparators 65,67.

When the absolute value of the current signal 31A is greater than a predetermined level, capacitor 69 is held in a discharged state by the window comparator output 71. After that absolute value falls within the window, the capacitor 69 is allowed to charge through resistor 73, thereby generating a fixed time delay at the (+) input of comparator 35. The first timer 59 is adapted to delay the signal 55A (FIG. 1) of the window comparator output 71 and output a delayed signal 83.

The comparator 35 is adapted to compare the delayed signal 83 to the envelope 33A of the rectified current signal 32A, in order to provide an output 98 with a pulse, which persists for a relatively longer time for a relatively small value of the envelope 33A, and which persists for a relatively shorter time for a relatively large value of such envelope. The pulse at the output 98 will not occur at all if the load current 75 does not dwell near about zero longer than the variable time period generated by comparing the signal 83 and the envelope 33A of the rectified current signal. The (−) input of that comparator 35 is referenced to the output 33A of the slow time decay peak detector 33. The comparison between these two voltages generates a timing function with a variable period controlled by the peak current amplitude. That is, the larger the current, the shorter the time period. Since, for a sinusoidal current, the time spent within the window decreases with increasing amplitude, this variable timer works to maximize the effectiveness of the circuit 29 to recognize current signatures, which dwell at the zero crossing for more time than expected for a motor inrush waveform. If the dwell time of the load current 75 is longer than expected for a sinusoidal waveform, then the output 98 of comparator 35 turns on the current source 63 formed by the transistors 77,79 for the duration of the excess dwell time.

The two window comparators 65,67 have the common output 71 to the timer 59, which is formed by the series combination of the capacitor 69 and the resistor 73, which are electrically connected to the common output 71. The capacitor 69 is normally discharged by the (high) common output 71 when the absolute value of the current signal 31A is greater than the first predetermined value as determined by divider 81 when either of the outputs 65A,67A of the respective comparators 65,67 is turned on. The capacitor 69 is charged through the resistor 73 when the absolute value of the current signal 31A is less than the first predetermined value and, thus, both of the outputs 65A,67A of the respective comparators 65,67 are turned off, in order to generate the delayed signal 83 after a first time period as set by the first timer 59.

The comparator 57 of the second circuit 36 has a negative input (−) for the rectified current signal 32A, a positive input (+) for a signal 85 representative of a second predetermined value, and an output 87. The comparator 57 provides a threshold detector circuit that is adapted to detect if the rectified current signal 32A exceeds the second predetermined value (e.g., without limitation, about five times rated current as set by the signal 85). The second timer 61 is adapted to delay the comparator output 87 after the rectified current signal 32A is below the second predetermined value and output a delayed signal 88. Hence, the current source 63 remains enabled for a period of time (e.g., as set by the RC value of the second timer 61) after the rectified current signal 32A falls below the second predetermined value. The second timer 61 includes a diode 89, a resistor 91, and a capacitor 93 in series with the resistor 91. The resistor 91 and the capacitor 93 are electrically connected to the anode of the diode 89. The cathode of the diode 89 is electrically connected to the output 87 of the comparator 57.

An AND circuit 95 provides an output 97 responsive to the pulse output 98 of the comparator 35 and the second delayed signal 88 of the second timer 61. The AND circuit 95 includes the current source 63 having an input 99 for the pulse output 98 of the comparator 35 and the output 97. The AND circuit 95 also includes a switch, such as the transistor 77, including a base input for the second delayed signal 88 and a source output, which disables the current source input 99 when the transistor 117 of the second timer 61 is turned on. The delayed signal 88 disables the output 97 of the second arc fault detector circuit 29 for the rectified current signal 32A being less than the second predetermined value after the second time delay, and enables that output 97 for that rectified current signal 32A being greater than the second predetermined value.

The accumulator circuit 37 of FIG. 1 includes the integrator portion 38 and the buffer portion 39 having the output 41 with the trip signal 26. The output 41 is responsive to the output 28C of the first arc fault detector circuit 28 and to the output 98 of the comparator 35, when enabled by the AND circuit 95. The integrator portion 38 includes a resistor 105 in parallel with a capacitor 107. The capacitor 107 is charged by pulses through another resistor 109 and is discharged through the resistor 105.

Suitable arc fault detectors, such as the AFD circuit 28 are disclosed, for example, in U.S. Pat. Nos. 5,224,006; 5,691,869; and 5,818,237, which are hereby incorporated by reference herein.

The comparator 57 forms a threshold detector analogous to a conventional "short delay" detector. Normally, for relatively small amplitudes of the current signal 31A, capacitor 93 of the second timer 61 maintains a charged state and transistor 117 is turned on, thereby disabling the current source 63 formed by the transistors 77,79. After the load current 75 exceeds a predetermined level (e.g., without limitation, about five times rated current), capacitor 93 is discharged by the output 87 of comparator 57 and transistor 117 is turned off, thereby enabling the current source 63 to be activated by the window comparator 55 through the output 98 of the comparator 35. After the load current 75 again drops below the critical threshold, transistor 117 remains off for a duration of time determined by the time constant of resistor 91 and capacitor 93. This time delay sets a maximum period in which the current source 63 can be enabled after each relatively high current event. Thereby, multiple events (i.e., half cycles) need to occur to accumulate enough activity to cause the circuit 29 to initiate the trip. If the load current 75 fails to exceed the critical threshold, then the current source 63 remains disabled and no activity is accumulated by the circuit 38.

The second arc fault detector circuit 29 is adapted to be non-responsive to the load current 75 being, for example, a sinusoidal motor start-up inrush current and, conversely, to be responsive to such load current having a wet track arc signature.

A suitably regulated AC/DC power supply 119 employs an alternating current voltage between earth ground 121 and the AC ground reference 123 at the load side of the separable contacts 11, in order to provide suitable DC outputs +14 VA 125 and −14 VA 127.

Although not required, a suitable power supply monitoring circuit, such as circuit 129, may be employed as is disclosed in U.S. Pat. No. 6,650,515, which is hereby incorporated by reference herein.

As is also not required, a suitable comparator circuit, such as 131, monitors one or more of the circuit breaker terminal temperatures. For example, two negative temperature coefficient thermistors (not shown) are mounted at the circuit breaker line terminal 133 and load terminal 135 (of FIG. 1) and initiate a trip if those terminals 133,135 overheat. Those thermistors are electrically connected in parallel between the +14 VA voltage 125 and the input 134 of the circuit 131. For example, if the electrical connection to one or both of the terminals 133,135 is relatively poor, thereby causing overheating, then this circuit 131 independently trips the circuit breaker 3. As the terminal temperature rises, the thermistor resistance decreases, which causes the circuit 131 to generate an output signal 136 that is input by the integrator portion 38 of the accumulator circuit 37 (FIG. 1). In turn, the circuit 37 ultimately trips the circuit breaker 3. An example of the circuit 131 is also disclosed in incorporated by reference U.S. Pat. No. 6,650,515.

Figure 3:
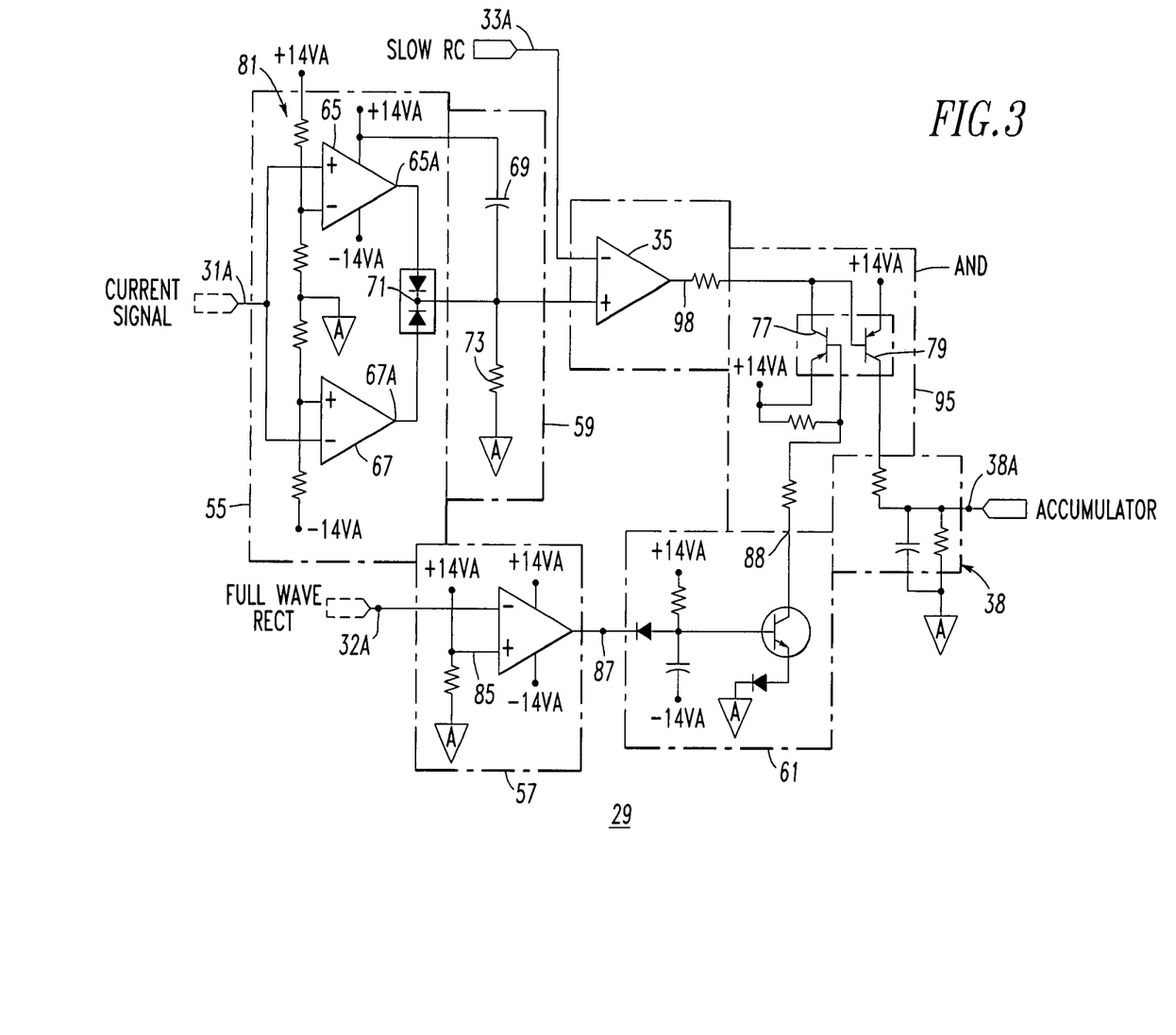
FIG. 3 is a schematic diagram of a circuit breaker arc fault detection circuit in accordance with another embodiment of the invention.

FIG. 3 shows the second arc fault detector trip circuit 29.

Figure 4:
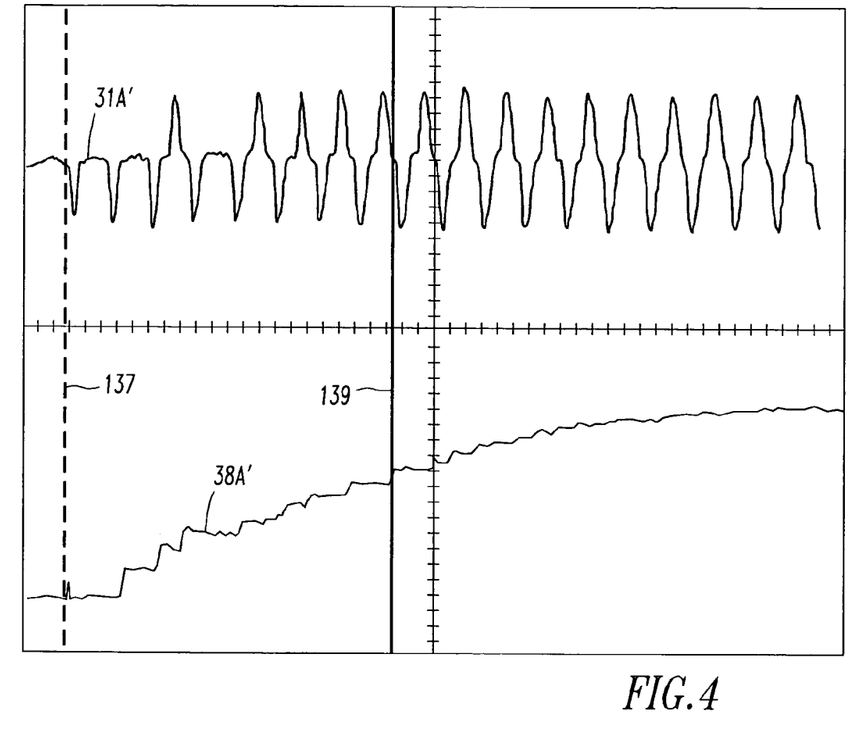
FIG. 4 is an example plot of the sensed current signal and the accumulated signal of FIG. 1.

In FIG. 4, example representations 31A' and 38A' of the current signal 31A and the integrator output 38A (FIG. 1), respectively, are shown. These waveforms are normalized in amplitude, in order that trip times may be evaluated on the basis of waveform shape only. The vertical cursor line 137 depicts the start of a wet track arc fault event and vertical cursor line 139 shows the approximate trip time. The circuit 29 of FIGS. 1 and 3 is preferably suitably calibrated, for example, to operate as a 2.5 A rated AFCI device and the waveforms are scaled to proportional values with an added 2.5 $A_{RMS}$ resistive parallel load (not shown).

Figure 5:
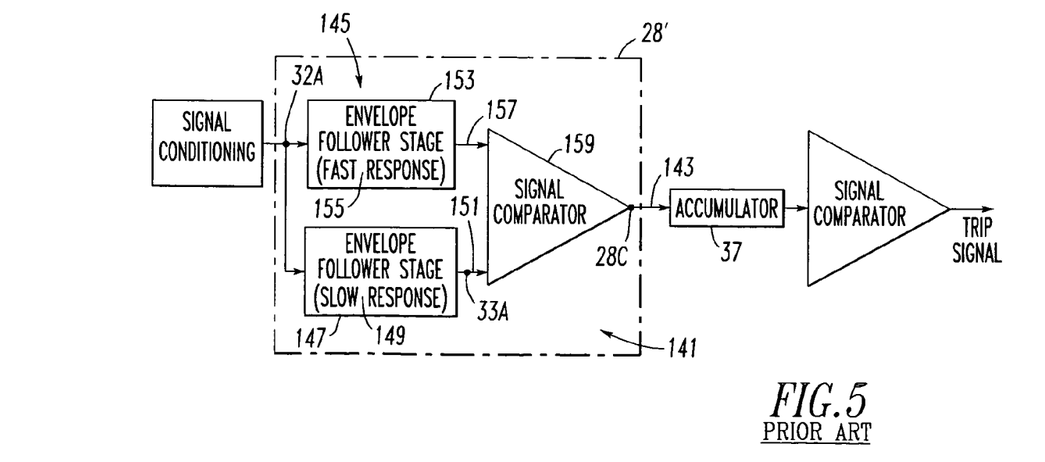
FIG. 5 is a block diagram of a circuit breaker arc fault detection circuit.

FIG. 5 shows a first arc fault detector circuit 28', which includes a circuit 141 adapted to generate an output signal 143 at the output 28C indicating an arc fault in the electrical system 1 (FIG. 1) in response to randomness in the envelope 33A of the rectified current signal 32A. In this example, a circuit 145 is adapted to track the envelope of the rectified current signal 32A. The circuit 145 includes a first sub-circuit 147 adapted to track the rectified current signal 32A with a first time constant 149 to generate a first tracking signal 151, and a second sub-circuit 153 adapted to track the rectified current signal 32A with a second time constant 155, which is shorter than the first time constant 149, in order to generate a second tracking signal 157. The circuit 141 includes a sub-circuit 159 adapted to compare the first and second tracking signals 151,157 and generate the output signal 143 when the second tracking signal 157 decays to a predetermined fraction of the first tracking signal 151.

Although analog circuits 22,29 are disclosed, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit breaker for interrupting current in an electrical system, said circuit breaker comprising:
    separable contacts adapted to interrupt said current in said electrical system;
    a trip mechanism adapted to trip open said separable contacts in response to a trip signal; and
    a trip circuit outputting said trip signal, said trip circuit comprising:
        a circuit adapted to generate a current signal representative of said current in said electrical system, to rectify said current signal to provide a rectified current signal and to track an envelope of said rectified current signal,
        a first arc fault detector circuit including a first output,
        a second arc fault detector circuit comprising:
            a first circuit adapted to detect when an absolute value of said current signal is less than a first predetermined value and output a signal after a first time period,
            a comparator adapted to compare said signal after a first time period to the envelope of said rectified current signal, in order to provide a second output with a pulse, which persists for a relatively longer time for a relatively small value of said envelope, and which persists for a relatively shorter time for a relatively large value of said envelope, and
            a second circuit adapted to enable the second output of said comparator if said rectified current signal exceeds a second predetermined value, and to disable the second output of said comparator after said rectified current signal is below said second predetermined value for a second time period, and
        an accumulator including an output having said trip signal, the output of said accumulator being responsive to the first output of said first arc fault detector circuit and to the second output of said comparator.

2. The circuit breaker of claim 1 wherein said first arc fault detector circuit comprises a first input of said rectified current signal, a second input of said envelope of said rectified current signal and means for generating an output signal at said first output indicating an arc fault in said electrical system in response to randomness in said envelope of said rectified current signal.

3. The circuit breaker of claim 2 wherein said circuit adapted to generate a current signal representative of said current in said electrical system, to rectify said current signal to provide a rectified current signal and to track an envelope of said rectified current signal comprises: a buffer inputting said current signal and providing a buffered current signal representative of said current in said electrical system, a full-wave rectifier inputting said buffered current signal and providing said rectified current signal, and first means for tracking said rectified current signal with a first time constant to generate a first tracking signal; and wherein said means for generating an output signal comprises second means for tracking said rectified current signal with a second time constant which is shorter than said first time constant to generate a second tracking signal, and means for comparing said first and second tracking signals and generating said output signal when said second tracking signal decays to a predetermined fraction of said first tracking signal.

4. The circuit breaker of claim 1 wherein said comparator is a first comparator; and wherein said second circuit includes a time delay and a second comparator having a negative input for said rectified current signal, a positive input for a signal representative of said second predetermined value, and an output, said time delay adapted to delay the output of said second comparator.

5. The circuit breaker of claim 1 wherein said first circuit includes a first comparator, a second comparator and a time delay, said first and second comparators having a common output, said time delay having a series combination of a capacitor and a resistor, which are electrically connected to said common output, said capacitor is normally discharged by said common output when the absolute value of said current signal is greater than the first predetermined value, said capacitor is charged through said resistor when the absolute value of said current signal is less than the first predetermined value, in order to generate said signal after a first time period.

6. The circuit breaker of claim 1 wherein said accumulator further includes an integrator portion responsive to the first output of said first arc fault detector circuit and to the second output of said comparator, and a buffer portion including said output having said trip signal.

7. The circuit breaker of claim 1 wherein said trip mechanism includes a trip latch adapted to trip open said separable contacts, a trip coil adapted to actuate said trip latch when energized, and a circuit adapted to energize said trip coil.

8. A circuit breaker for interrupting current in an electrical system, said circuit breaker comprising:
    separable contacts adapted to interrupt said current in said electrical system;
    a trip mechanism adapted to trip open said separable contacts in response to a trip signal; and
    a trip circuit outputting said trip signal, said trip circuit comprising:
        a first circuit adapted to generate a current signal representative of said current in said electrical system,
        a second circuit adapted to rectify said current signal and provide a rectified current signal,
        a third circuit adapted to track an envelope of said rectified current signal,
        a first arc fault detector circuit including a first input of said rectified current signal, a second input of said envelope of said rectified current signal and a first output,
        a second arc fault detector circuit comprising:
            a window comparator circuit adapted to detect when an absolute value of said current signal is less than a first predetermined value and output a signal,
            a first time delay adapted to delay the signal output by said window comparator and output a first delayed signal,
            a comparator adapted to compare the first delayed signal of said first time delay to the envelope of said rectified current signal, in order to provide an output with a pulse, which persists for a relatively longer time for a relatively small value of said envelope, and which persists for a relatively shorter time for a relatively large value of said envelope, a threshold detector circuit including an output with a signal, said threshold detector circuit adapted to detect if said rectified current signal exceeds a second predetermined value, a second time delay adapted to delay the signal of the output of said threshold detector circuit after said rectified current signal is below said second predetermined value and output a second delayed signal, and an and circuit outputting a second output responsive to said pulse and said second delayed signal, and an accumulator including an output having said trip signal, the output of said accumulator being responsive to the first output of said first arc fault detector circuit and to the second output of said and circuit.

9. The circuit breaker of claim 8 wherein said second arc fault detector circuit is adapted to be non-responsive to said current in said electrical system being a sinusoidal motor start-up inrush current and to be responsive to said current in said electrical system having a wet track arc signature.

10. The circuit breaker of claim 8 wherein said first arc fault detector circuit comprises means for generating an output signal at said first output indicating an arc fault in said electrical system in response to randomness in said envelope of said rectified current signal.

11. The circuit breaker of claim 10 wherein said third circuit comprises first means for tracking said current signal with a first time constant to generate a first tracking signal; and wherein said means for generating an output signal comprises second means for tracking said current signal with a second time constant which is shorter than said first time constant to generate a second tracking signal, and means for comparing said first and second tracking signals and generating said output signal when said second tracking signal decays to a predetermined fraction of said first tracking signal.

12. The circuit breaker of claim 8 wherein said second delayed signal disables the second output of said and circuit for said rectified current signal being less than said second predetermined value after said second time delay, and enables the second output of said second arc fault detector circuit for said rectified current signal being greater than said second predetermined value.

13. The circuit breaker of claim 8 wherein said accumulator comprises a resistor in parallel with a capacitor.

14. The circuit breaker of claim 13 wherein said and circuit comprises a current source including an input for said pulse and an output, which is said second output; and a switch including an input for the second delayed signal and an output, which disables the input of said current source.

15. The circuit breaker of claim 8 wherein said comparator is a first comparator; wherein said threshold detector circuit comprises a second comparator including a negative input for said rectified current signal, a positive input for a signal representative of said second predetermined value, and an output.

16. The circuit breaker of claim 15 wherein said second time delay comprises a diode including an anode and a cathode, a resistor, and a capacitor in series with said resistor, with said resistor and said capacitor being electrically connected to the anode of said diode, and with the cathode of said diode being electrically connected to the output of said second comparator.

17. The circuit breaker of claim 8 wherein said window comparator includes a first comparator and a second comparator, said first and second comparators having a common output; wherein said first time delay includes a series combination of a capacitor and a resistor, which are electrically connected to said common output; wherein said capacitor is normally discharged by said common output when the absolute value of said current signal is greater than the first predetermined value; and wherein said capacitor is charged through said resistor when the absolute value of said current signal is less than the first predetermined value, in order to generate said first delayed signal.

18. The circuit breaker of claim 17 wherein said first comparator includes a first output and a first diode having an anode and a cathode; wherein said second comparator includes a second output and a second diode having an anode and a cathode; wherein the cathodes of said first and second diodes are electrically connected to said common output; and wherein the anodes of said first and second diodes are electrically connected to the first and second outputs of said first and second comparators, respectively.

19. The circuit breaker of claim 8 wherein said comparator includes a negative input for the envelope of said rectified current signal, a positive input for said second delayed signal, and said output with said pulse.

20. Apparatus for detecting a wet track arc fault for a current in an electrical system including a circuit providing a current signal from said current, a circuit providing a rectified current signal from said current signal, and a circuit providing an envelope of said rectified current signal, said apparatus comprising:

a first circuit adapted to detect when an absolute value of said current signal is less than a first predetermined value and output a signal after a first time period;

a comparator adapted to compare said signal after a first time period to the envelope of said rectified current signal, in order to provide an output with a plurality of pulses, said pulses persisting for a relatively longer time for a relatively small value of said envelope, and persisting for a relatively shorter time for a relatively large value of said envelope;

a second circuit adapted to enable the output of said comparator if said rectified current signal exceeds a second predetermined value, and to disable the output of said comparator after said rectified current signal is below said second predetermined value for a second time period; and a third circuit adapted to accumulate said pulses from the output of said comparator and output a signal representative of said wet track arc fault.

* * * * *